(12) United States Patent
Dalström

(10) Patent No.: US 6,726,487 B1
(45) Date of Patent: Apr. 27, 2004

(54) DEVICE FOR SUPPORTING READING OF A TEXT FROM A DISPLAY MEMBER

(76) Inventor: Tomas Dalström, Surbrunnsgatan 30, Stockholm (SE), SE-113 48

( * ) Notice: Subject to any disclaimer, the term of this patent is extended or adjusted under 35 U.S.C. 154(b) by 0 days.

(21) Appl. No.: 09/744,508

(22) PCT Filed: Dec. 23, 1999

(86) PCT No.: PCT/SE99/02479

§ 371 (c)(1),
(2), (4) Date: Jan. 24, 2001

(87) PCT Pub. No.: WO00/39776

PCT Pub. Date: Jul. 6, 2000

(30) Foreign Application Priority Data

Dec. 23, 1998 (SE) ............................................. 9804547

(51) Int. Cl.⁷ ............................................. G09B 17/00
(52) U.S. Cl. ..................... 434/178; 434/156; 434/178; 434/179; 434/180; 434/181; 434/182; 434/183; 434/308; 434/317; 715/531; 345/901; 345/684
(58) Field of Search ............................... 434/178–183, 434/307 A, 308, 317; 345/636, 730–732, 684–689, 901; 715/531

(56) References Cited

U.S. PATENT DOCUMENTS

| 3,698,103 A | 10/1972 | Harmon |
| 3,721,021 A | 3/1973 | Stewart et al. |
| 3,818,130 A | 6/1974 | Uhler |
| 3,878,327 A | 4/1975 | Uhler |
| 4,160,242 A | 7/1979 | Fowler et al. |
| 5,451,163 A * | 9/1995 | Black .......................... 434/178 |
| 5,592,143 A | 1/1997 | Romney et al. |
| 6,113,394 A * | 9/2000 | Edgar .......................... 434/179 |

FOREIGN PATENT DOCUMENTS

| GB | 1282595 | 7/1972 |
| JP | 10268878 | 10/1998 |

OTHER PUBLICATIONS

Wagner, Dan; Birt Joseph; Snyder, Michael; Duncanson, James. Human Factors Design Guide. Jan. 1996, U.S. Department of Transportation (FAA). pp. 10.29 and 3.10.*
Gourter, Gini and Marquis, Annette, Microsoft Office 97: No Experience Required. Sybex, 1997. www.library.books24x7.com.*

* cited by examiner

Primary Examiner—Teresa Walberg
Assistant Examiner—Cameron Saadat
(74) Attorney, Agent, or Firm—Swidler Berlin Shereff Friedman, LLP

(57) ABSTRACT

The invention refers to a device for supporting reading of a text from a display member (1) in order to increase the reading speed. The device includes first means (2, 4) which are arranged to provide a text, which consists of a number of characters forming words in said text, and to display at least a part of the text on the display member (1), an second means (2, 5), which are arranged to display a marking means (7) which marks at least one character of said part of the text on the display member (1). The second means are arranged to move the marking (7) in an automatic manner on the displayed part of the text in order to control the reading of the text.

8 Claims, 3 Drawing Sheets

DEVICE FOR SUPPORTING READING OF A TEXT FROM A DISPLAY MEMBER

THE BACKGROUND OF THE INVENTION AND PRIOR ART

The present invention refers to a device for supporting reading of a text from a display member, comprising first means, which are arranged to provide a text, which consists of a number of characters forming words in said text, and to display at least a part of said text on the display member. When we read a text from a paper we normally read at a reading speed of 150–300 words per minute. The higher figure refers to an easier text and the lower figure to a more complicated text. Investigations have been done showing that the reading speed is about 25% lower when we read a text from a screen. It means that the normal reading speed from a screen is about 110–125 words per minute. There are probably several explanations to why reading of a text from a screen is slower than from a paper, but probably all people reading texts from screen as well as paper are aware of this difference.

When reading from a paper, it is known to utilise some sort of aiding means, for instance a finger or a pencil, wherein the pencil advantageously is guided along the text rows somewhat ahead of the word to be read for the moment. Research has disclosed that such a reading technique enables a significant increase of the reading speed without reducing the capability of memorising the text read.

Different types of read aiding means are also known from the patent literature. For instance, U.S. Pat. No. 3,872,327 discloses a device for facilitating reading of a text from a TV-screen. Thereby, the TV-screen is covered by a raster in such a way that the whole of the text disappears and only the word or words to be read are visible to the user in a window. The window may move at a desired speed over the screen and in such a way the reader is forced to follow the movements of the window with the eyes. However, such a device ought to have certain disadvantages since only the words to be read for the moment are visible. It is difficult to the user to have an overview of the text and to know where in the text he is positioned. Furthermore, the window with the displayed words or word seems to move stepwise rather than at a uniform continuous movement in order to display whole words at each moment. U.S. Pat. No. 3,721,021 discloses a mechanical device including a ruler being movable vertically over a text. U.S. Pat No. 5,592,143 discloses a device for supporting reading by means of a pulsating sound. The frequency of the sound pulses generated are variable in order to improve the reading learning. U.S. Pat. No. 3,698,103 discloses another mechanical device for increasing the reading speed of a user. The mechanical device includes a plurality of cam-controlled diaphragm members sequentially showing areas of a text.

Furthermore it is known to feed successively a text to a piece of music in a so called karaokee-machine. Thereby, one or two rows of the text is disclosed, which are fed successively at a speed determined by the music.

SUMMARY OF THE INVENTION

The object of the present invention is to provide a device or a tool by which reading of a text from a display member may be facilitated and more efficient, in particular by which the reading speed may be increased.

This object is obtained by the device initially defined, which includes second means which are arranged to display a marking, marking at least one character of said part of the text on the display member, wherein said second means are arranged to move the marking in an automatic manner on the displayed part of the text in order to control the reading of the text. Such a marking which automatically moves over a text facilitates to a reader to follow the text with the eyes. The reader may thereby concentrate to a higher extent on the content of the text and does not need to force himself to look after his position in the text. By a marking according to the invention a significant increase of the reading speed ought to be possible to obtain.

According to an embodiment of the invention, said second means are arranged to control the movement of the marking in such a way that the movement appears as a substantially continuous movement along a preferably horizontal portion of the displayed part of the text or in other words along a row of the displayed part of the text. By such a uniform movement of the marking, the eyes of the reader may easily follow the text i.e. the marking is moving without jumping from character to character with a continuous speed over a text portion, for instance a text row, before it comes to the next row.

According to a further embodiment of the invention, a regulating member is provided, by means of which the speed, by which the marking moves over the text, is controllable. By such a regulating member an individual adaptation of the moving speed of the marking is obtained. The reader may also adapt the speed to different degrees of difficulty of the text being read for the moment.

According to a further embodiment of the invention, said second means are arranged to change from displaying said part of the text to displaying a successive part of the text when the marking is located in the proximity of the end of said part, wherein the marking is arranged to move continuously in the text from said part to the successive part. In such a way, an automatic scrolling of the text is obtained and the user will in an easy manner find the correct position in the text for continuing reading after a page break, i.e. the marking will be located where the user is to begin the reading after a page break.

According to a further embodiment of the invention, the marking includes an area which is displayed on the display member and located in front of the marked character, wherein said area hides substantially completely the part of the text which is located within said area. The marking forms thereby a forward limit of the part of the text which is displayed on the display member. Thereby, the marking may be arranged to display the area as a substantially empty surface. Such an empty or substantially blank surface without any signs or patterns does not guide away the eyes, but the reader may concentrate on the text. Advantageously, the marking may be arranged to permit selection of colour of the substantially empty surface.

According to a further embodiment of the invention, an initiating member is arranged to permit a user to start and stop, respectively, the movement of the marking. In such a manner it is easy for the reader to take a short break in reading, for instance, for any purpose.

According to a further embodiment of the invention, said second means are arranged to display the marking in such a manner that the marking appears as a substantially fixed marking. It is not tiring to keep the eyes on such a fixed marking moving along the text in comparison with a marking which twinkles for instance.

According to a further embodiment of the invention, the text is provided in a conventional manner per se in rows having a number of words in each row, wherein said second means are arranged to control the movement of the marking from one row to another row. Thereby, said second means may be arranged to control the movement of the marking from one row to the successive row in such a manner that the marking jumps from the one row from a position located at a distance from the end of the row in question to the successive row to a position located at a distance from the beginning of the row in question.

According to a further embodiment of the invention, the marking includes a line or a stroke extending beneath at least one character along the row in question. Other examples of advantageous embodiments of the marking are a shadowing extending over at least one character along the row in question, a frame extending around at least one character in said part of the text or a italicising of at least one character in said part of the text. Thereby, the marking may advantageously be arranged to mark, at each point of time, a number of characters on the display member or to mark, at each point of time, at least one word in said part of the text.

The object is also obtained by the device initially defined, which includes second means arranged to feed successively said part of the text on the display member in Such a manner that a forward limit of said part of the text is moved forwardly and that an increasing part of the text is disclosed, wherein said second means are arranged to move said limit in an automatic manner in order to control the reading of the text.

Preferred embodiments of this device are described below in greater detail.

According to a further embodiment of the invention, the display member includes an electronic display member, for instance in the form of a cathode-ray tube or a LCD-screen. Furthermore, said first means may include a computer, for instance a PC, digital television, pagers, cellular telephones, for instance so called WAP-telephones, radio or an electronic book. Said first means also include software, e.g. in the form of a word-processing program.

According to a further embodiment of the invention, a third means are arranged to permit storing of a portion of the text in a memory member, wherein these third means include an actuating member designed to initiate storing by the reader defining a start position and an end position for said portion. In such a way it is possible to create a directory including text portions being interesting to the reader.

BRIEF DESCRIPTION OF THE DRAWINGS

The present invention is now to be explained more closely by means of embodiments describe as examples and with reference to the drawings attached hereto.

DETAILED DESCRIPTION OF DIFFERENT EMBODIMENTS OF THE INVENTION

Figure 1:
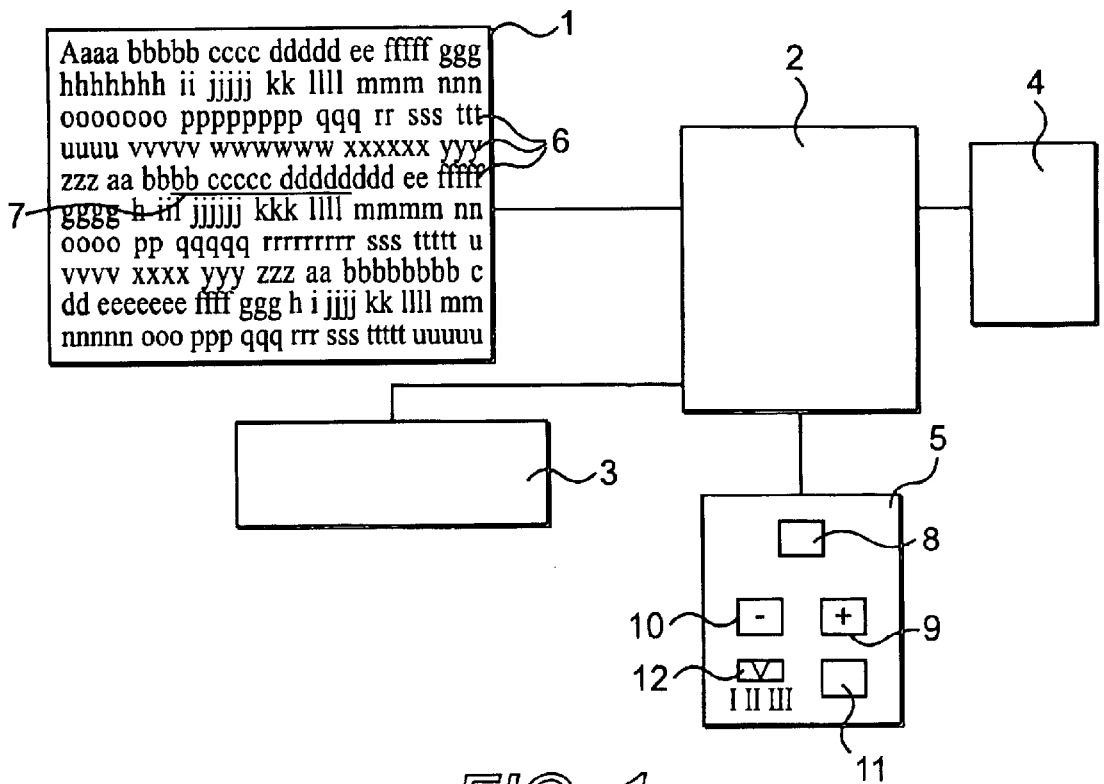
FIG. 1 discloses schematically a device for supporting reading according to an embodiment of the invention.

FIG. 1 discloses schematically how a reading support device according to the invention may be designed. The device includes an electronic display member in the form of a screen, for instance of the type cathode-ray tube or a so called LCD-screen, i.e. a screen with liquid crystals. The screen 1 is connected to a processor unit 2 which receives commands from an input unit 3 which may include a keyboard and/or a mouse. Furthermore, the processor unit 2 co-operates with a memory member 4 including an internal memory and a memory in the form of a hard-disc. The components disclosed form parts of a conventional computer. In addition, the device includes a control unit 5 to be described more closely below.

The device is arranged to enable displaying a text on the screen 1. The text includes in a normal manner a number of characters forming words in the text, which are arranged in substantially horizontal rows 6. In a usual way, a part of a longer text is disclosed on the screen, which text is digitally stored in the memory member 4, or any other memory member, for instance a diskette or a CD, and which is successively disclosed on the screen 1 by means of the processor unit 2.

According to the invention, the reading support device includes means arranged to display a marking on the screen 1. In FIG. 1, a marking 7 in the form of a line is disclosed, which extends substantially horizontally, i.e. in parallel with a row 6 of the part of the text which is disclosed on the screen 1. The marking 7 is arranged to mark a number of characters in the text disclosed on the screen 1. Furthermore, the marking 7 is arranged to move along the text, i.e. by a movement extending substantially in parallel with a row 6 for guiding the reading of the text. The marking 7 is intended to move automatically, i.e. when the marking 7 is initiated, it moves by a substantially uniform speed over the text which is stationary during a period of time. When the marking 7 has reached the end of the part of the text disclosed on the screen 1, the text is displaced in such a way that one at least partly other part of the text is disclosed on the screen 1. The marking 7 will thereby move on the screen 1, for instance from the lower right corner to the upper left corner, but maintain its position in relation to the text. The movement of the marking 7 may be controlled by the control unit 5 which includes an initiating member 8, which is designed as a key and arranged to permit a user to start and stop, respectively, the movement of the marking 7 by a simple pushing. Furthermore, the control unit 5 includes a regulating member 9, 10 by which the moving speed of the marking 7 may be controlled. The regulating member 9, 10 includes a first key 9, which is indicated with a "+"-sign and by which the speed of the marking 7 may be increased by pushing the key 9, and a second key 10, which is marked with a "−"-sign and by which the speed of the marking 7 may be decreased by pushing the key 10.

Furthermore, the control unit 5 includes an actuating member in the form of a key 11 and a function selector 12 by which different functions may be obtained. For instance, by the function I storing of a portion of the text may be selected, which portion may be stored separately in the memory member 4 or any other memory unit. The storing may be initiated when the marking 7 moves over the text by a simple pushing of the key 11 and stopped by a successive pushing of the key 11 when the marking 7 has moved over a desired portion. The purpose of this function I is to make the stored portions easily accessible to the user and for instance able to be disclosed once again by a simple pushing of the key 11 when the marking 7 does not move over the text, i.e. when the reading support device is not activated. It is to be noted that the activation of the portions stored in the memory member 4 also can be obtained in other ways. By such a storing function a user may collect different text portions for an easy putting together of a lecture for instance.

If the function selector 12 is positioned in the position II a time measurement may be initiated by the key 11. By such a time measurement the user may read a part of the text disclosed on the screen 1 and thereafter once again push the key 11 in order to stop the time measurement. The reading support device is thereby arranged to calculate the reading speed, i.e. the number of words per time unit, whereafter the user may adjust the reading support device in such a way that the marking 7 moves by this speed. This function II is advantageous when the user reads texts of different degree of difficulty since a difficult text normally is to be read at a lower reading speed than an easier text. Advantageously, the screen 1 may be arranged to display the measured reading speed and also the reading speed by which the marking 7 moves. The reading support device may in addition be arranged to store individual reading speeds and automatically adjust this when a certain user wishes to read a text. Also other individual wishes may be adjusted automatically for each user, for instance character size, number of characters per row, number of words per row, margin for notes and comments etc.

With the function selector 12 in the position III a function is obtained, which enables a selective reading to a user, i.e. the user may skim through a text. This may for instance be obtained by moving the marking 7 vertically downwardly on the screen 1 or in such a way that the marking 7 jumps between headlines, intermediate headlines, preambles or captions. By the key 11 such a selective reading may be initiated and interrupted. Furthermore, the speed of the marking 7 may be increased or decreased in case of such a selective reading by means of the keys 9 and 10.

The means mentioned above, which are arranged to display the marking 7 and provide its movement, may be realised in the form of a computer program which is stored in the memory member 4 in a conventional manner. In the same way, the means by which portions of the text may be stored in the memory member 4 may be realised in the form of a computer program stored in the memory member 4.

The means mentioned above are thus arranged to move the marking 7 in such a way that its movement appears as a substantially continuous uniform movement along the text. It is advantageous that the marking 7 does not jump from character to character or possibly from word to word, which would be tiring to a user when he reads the text. Furthermore, the means are arranged to display the marking 7 in such a way that it appears as a substantially fixed marking, i.e. that the marking 7 does not twinkle.

Advantageously, the movement of the marking 7 over the text is controlled in such a way that it jumps from one row 6 from a position located at a distance from the end of the row in question to the successive row 6 to a position located at a distance from the beginning of this row 6. Such a movement of the marking 7 corresponds to the movement of the eyes over a text during advanced reading with, for instance, a pencil as aiding means, i.e. the pencil is positioned a number of characters or one or two words ahead of the part of the text which is read and processed by the brain. This advanced way of reading is supported by such a moving from row to row of the marking 7.

Figure 2:
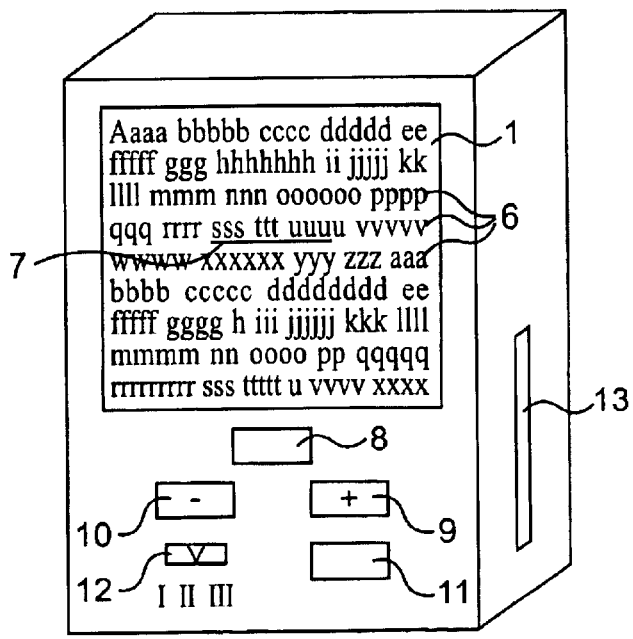
FIG. 2 discloses schematically a device for supporting reading according to another embodiment of the invention.

FIG. 2 discloses a second embodiment of the reading support device. In this case, the device is designed as an electronic book with a screen 1 and the keys 8, 9, 10, 11 and 12, which correspond to the keys provided in the device in the first embodiment disclosed in FIG. 1. Also the device in is FIG. 2 includes a processing unit (not disclosed in FIG. 2) and a memory member including an aperture 13 for receiving an information carrier, for instance a CD. In other respects the reading support device disclosed in FIG. 2 functions in the same way as the one disclosed in FIG. 1.

Figure 3:
FIG. 3 discloses a text with an example of a marking according to the invention.
Figure 4:
FIG. 4 discloses a text with an other example of a marking according to the invention.
Figure 5:
FIG. 5 discloses a text with a further example of a marking according to the invention.
Figure 6:
FIG. 6 discloses a text with a further example of a marking according to the invention.
Figure 7:
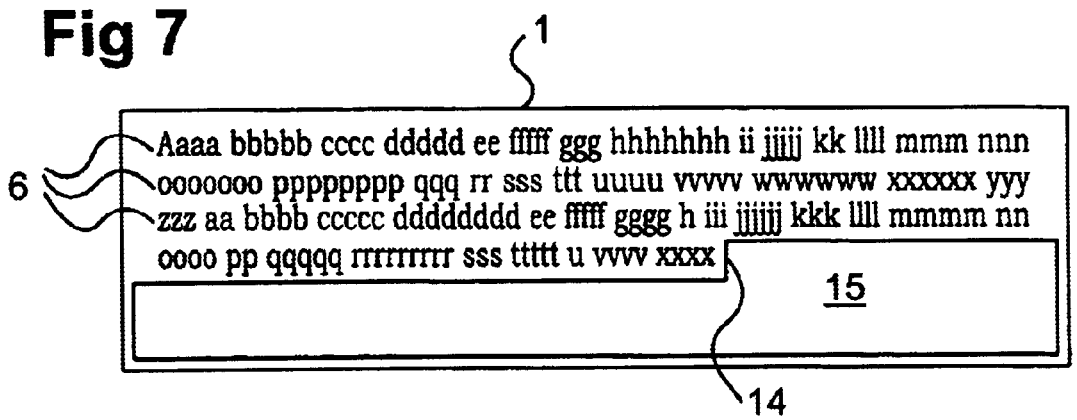
FIG. 7 discloses a text with a further example of a marking having a blank area according to the invention.

FIGS. 3–7 disclose different embodiments of the marking 7. In FIG. 3, the marking is designed as a dot located beneath a character in the text. In FIG. 4, the marking 7 is designed as a frame or a window surrounding a number of characters in the text and extending in parallel with a row 6 of the text. In FIG. 5, the marking 7 is designed in such a way that the characters to be marked are displayed by bold type. The other characters in the text have here, as an example, been displayed by italicised type. FIG. 6 discloses a marking 7 including a shadowing of an area within which the characters to be marked are located. This shadowing may be performed in a grey tone scale or in any suitable colour. Of course it is essential that the shadowing is so week that the text located therebehind is clearly legible. FIG. 7 discloses a marking in the form of a forward limit 7 of the displayed part of the text. The limit 14 moves successively and substantially continuously forwardly in such a way that an increasing part of the text is disclosed on the screen 1. According to this embodiment, the marking may also include an area 15, which is located ahead of the limit 14 and which advantageously may extend to the end of the screen 1. Thereby, the part of the text located ahead of the limit 14 and thus within the area 15 may be substantially completely hidden to a user. Possibly, the hidden area 15 may be made legible during a break in the reading of the text. The area 15 may be displayed as an substantially empty surface. It is also possible by means of the control unit 5 to select a to the user suitable color of the area 15 or the substantially empty surface. It is to be noted, that the limit 14 may be visible on the screen as a vertical line, for instance. The limit 14 may also be invisible in the sense that it is not marked but merely forms the transfer to the area 15.

It is to be noted that the marking 7 may be designed in many further manners, for instance it may include a line located above the characters to be marked. The marking 7 may also be designed as a filled circle moving along the text.

The invention is applicable to all types of texts which are displayed on a screen, for instance texts in word-processing programs, texts received via E-mail, Internet or any other network, text-TV, digital TV, radio, pager etc. The invention may for instance be realised as a computer program adapted to present word-processing programs and other types of programs supporting text-reproduction. Consequently, the invention may be utilised for reading of novels, articles, correspondents, E-mail and the like. The invention is also advantageous during for instance proof reading of drafts to different writs.

The invention is not limited to the embodiments described but may be varied and modified within the scope of the following claims.

The control unit 5 disclosed may form a part of a computer or be formed by a program stored in a computer, wherein the functions of the keys 8, 9, 10, 11 and 12 may be realised by means of the keys of a key-board of standard type and/or a mouse. It is also possible to provide the reading support device with voice control, wherein the keys 8, 9, 10, 11 and 12 may be replaced or supplemented by voice commands.

The invention may advantageously include further functions which may be implemented in the computer or the similar device including the reading support device. There may for instance be a routine which in an automatic manner replaces characters which in the specific context are incomprehensible but which may appear during conversion between different formats. The reading support device may also include a vocabulary of synonyms, which offers a user a synonym to a word in the text.

The reading support device may also include means for music reproduction, preferably at a time corresponding to the pace of the pulse of the user. Studies show that the brain is able to receive information faster if it slows down and reaches the so called alpha-state, which is facilitated by means of such music.

The reading support device may also be provided with a search function, wherein the marking is located for instance one or two sentences ahead of a defined search word.

By means of the control unit s the time of breaks after different punctuation marks, change of row, and scrolling may be controlled.

What is claimed is:

1. A device for supporting reading of a text from a display member, comprising:

first means arranged to provide a text comprising characters forming words in said text;

second means arranged to display successively a portion of the text on the display member in such a way that a forward limit of said portion of the text is moved forwardly over the display member and that an increasing part of the text is displayed, said displayed part of the text being stationary, wherein said second means are arranged to move said limit in an automatic manner in order to control the reading of a text, wherein said second means are arranged to control the movement of said limit in such a manner that the movement appears as a substantially continuous movement without jumping from character-to-character, and wherein said second means are arranged to hide substantially completely an area of said part of the text that is located ahead of said limit, and wherein said second means are arranged to change from displaying said portion of the text to a successive portion of the text when the forward limit is located in the proximity of the end of said portion, wherein the forward limit is arranged to move from said portion to said successive portion; and a regulating member by means of which the speed by which said limit moves over the text is controllable.

2. A device according to claim 1, characterized in that the text is provided in a conventional manner per se in rows with a number of words in each row, wherein said second means are arranged to control the movement of the limit from one row to another row.

3. A device according to claim 2, characterized in that said second means are arranged to control the movement of the limit one row to the successive row in such a way that the limit jumps from one of the rows from a position located at a distance from the end of the row in question to the successive row to a position located at a distance from the beginning of the row in question.

4. A device according to claim 1, characterized in that said second means are arranged to display an area as a substantially empty surface.

5. A device according to claim 4, characterized in that said second means are arranged to permit selection of color of the substantially empty surface.

6. A device according to claim 1, characterized in that the display member includes an electronic display member.

7. A device according to claim 1, characterized in that said first means includes a computer.

8. A device according to claim 1, characterized by third means which are arranged to permit storing of a portion of the text in a memory member and which include an actuating member which is designed to initiate storing by the reader defining a start position and an end position for said portion.

* * * * *